July 31, 1945.　　　F. NIESEMANN　　　2,380,459

GAS PRESSURE REGULATOR

Filed July 27, 1942

Inventor

FRITZ NIESEMANN

Attorney

Patented July 31, 1945

2,380,459

UNITED STATES PATENT OFFICE 2,380,459

GAS PRESSURE REGULATOR

Fritz Niesemann, Pittsburgh, Pa., assignor to Pittsburgh Equitable Meter Company, Pittsburgh, Pa., a corporation of Pennsylvania Application July 27, 1942, Serial No. 452,457

4 Claims. (Cl. 50—23)

This invention relates to gas pressure regulators.

It is an object of the present invention to provide a gas pressure regulator composed of relatively few parts and which may be readily assembled or disassembled.

Another object is the provision of a gas pressure regulator which may be cast in substantially its finished form, the only machining operation required being that of cutting screw threads.

Another object is the provision of a gas pressure regulator wherein possibilities of leakage to the exterior are reduced by reduction of the number of joints.

Figure 1:
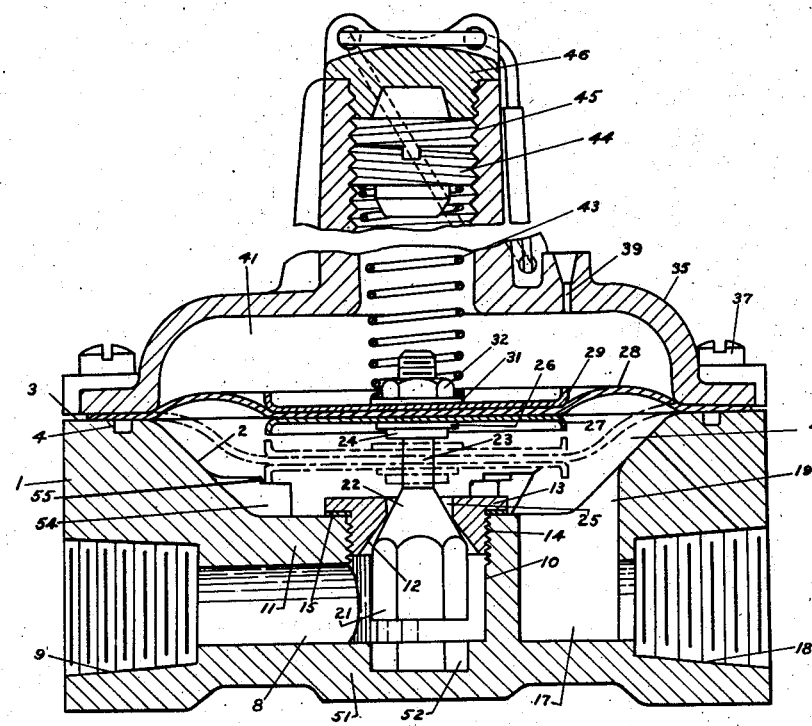
Figure 2:
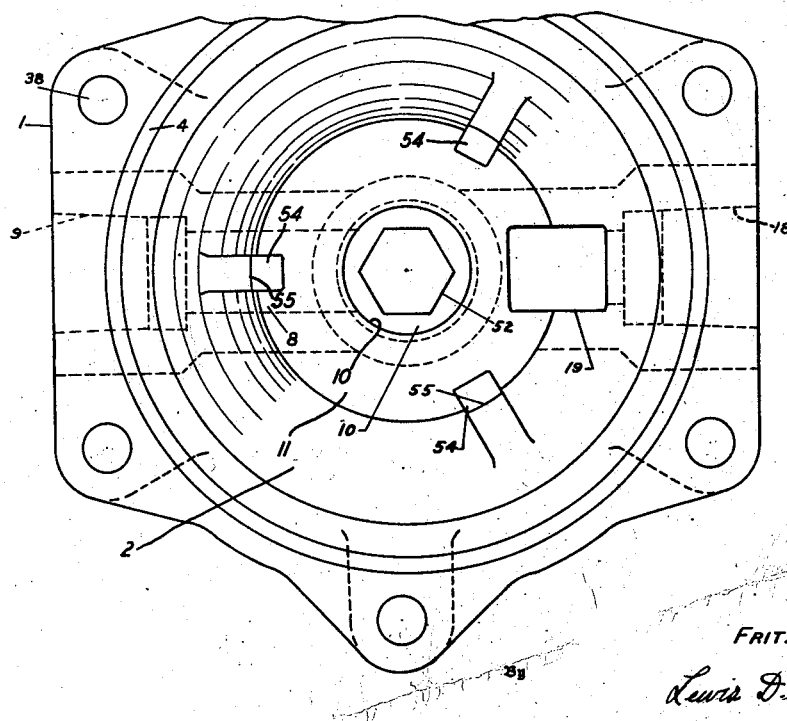

These and other objects will be apparent upon consideration of the following specification taken in connection with the attached drawing, wherein I have shown a preferred embodiment of my invention by way of example, and wherein Figure 1 is a vertical section of the preferred embodiment, and Figure 2 is a top view of the bottom or body.

Referring to the drawing, the body 1 may be cast or forged in a single piece, and is designed to avoid the use of complicated cores or cores which must be destroyed to allow their removal. It is preferably made as a die casting of aluminum, zinc or other suitable metal or alloy, and has a conical cavity 2 in the top. The top surface 3 is smooth and has a circumferential groove 4 formed therein. The body has a transverse passage 8 constituting the inlet side thereof which is threaded at 9 to enable the body to be connected into a suitable pipe line and passage 8 merges with a central vertical aperture 10 in the bottom partition 11 of cavity 2. The seat in this aperture 10 preferably is formed at 12 on a flanged bushing 13, and may be tapered or conical, the aperture 10 being screw threaded at 14 to receive the bushing. Gasket 15, interposed between the flange of the bushing and the bottom partition 11, serves to seal the bushing against leakage at its periphery. The outlet passage 17 of the regulator preferably is the size of the inside pipe diameter and is screw threaded at 18 whereby it may be connected to a pipe line, and a vertical opening 19, which is shown of generally rectangular shape, passes through bottom wall 11 into passage 17.

A valve member 21, which preferably is of non-circular form, provides a tapered portion 22 adapted to coact with seat 12, and an integral stem portion 23 has a flange 24 preferably integral therewith, this flange being of slightly lesser diameter than the bore 25 in the bushing 13. Soft gasket 26 is located on the flange 24 and a diaphragm pan 27 is placed thereon, a pliable diaphragm 28 being clamped between pan 27 and a pan 29 by means of a washer 31 and nut 32 screwed on the screw threaded end of stem 23. The outer periphery of diaphragm 28 is clamped between a flange on cover 35 and the smooth top surface 3 of the body by means of screws 37 passing through holes 38 and held thereon by suitable nuts, the groove 4 serving to prevent leakage and thus eliminate the need for a gasket. Cover 35 has a vent 39 therein whereby a vented chamber 41 is formed above the diaphragm and a control chamber 42 is provided beneath the diaphragm by the cavity 2. The diaphragm is loaded by a suitable spring 43, the tension or pressure of which may be adjusted by a nut 44 threaded into the screw threaded bore 45 of the cover which is adapted to be closed by a screw threaded cap 46.

The bottom wall 51 of the casing 1 has formed therein a non-circular recess 52 which is shown as hexagonal in form and which is slightly larger than the hexagonal lower portion of the valve member 21. Recess 2 has projecting from the walls thereof three bosses 54 of equal height, with centering shoulders 55 thereon.

In operation, gas enters inlet 8 and when valve 21 is unseated it flows past seat 12 and through opening 25 into pressure chamber 42 and exits through opening 19 into outlet 17, and valve 21 tends to maintain a constant pressure at the outlet 17 in known manner. In assembling the parts, the valve member 21 first is inserted with its hexagonal end in recess 52, and bushing 13 then is threaded into place. The gasket 26 is placed on flange 24 and then diaphragm pan 27 is placed on the gasket. The diaphragm 28 is then placed on pan 27, pan 29 is placed on the diaphragm, and washer 31 is placed on pan 29. Nut 32 now is threaded onto stem 23, the recess 52 serving to hold the stem against rotation during assembly. In place of the non-circular recess in the bottom and the non-circular form of the valve member, any other suitable shape or arrangement of interfitting parts on the valve and body may be employed to hold the valve stem from turning during assembly.

Flange 24 is slightly smaller than the opening 25 in bushing 10 so that the valve stem 23 may be passed through the bushing, and is of sufficient size and thickness to provide an adequate rigid shoulder against which the diaphragm assembly may be clamped in gas tight relation, this shoulder is of sufficient area to prevent undue compression of the gasket. Bosses 54 are provided to act as stops and engage the periphery of diaghragm pan 27 and preferably provide centering shoulders 55 to enable the pan and diaphragm to be centered during assembly, as shown in dotted lines in Figure 1. This enables the diaphragm to be positioned with a proper slack or curvature therein so that when the cover is assembled in position the diaphragm is given the proper shape for easy operation, and it is not necessary to have bolt holes in the diaphragm. In operation the downward movement of valve stem 23 is limited so that flange 24 cannot obstruct opening 25 in bushing 13. This may be accomplished by bosses 54 engaging the diaphragm pan 27, or, if desired, by having the bottom of recess 52 engage the valve 21.

Various modifications may be made in the invention without departing from the spirit or scope thereof.

What I claim as my invention and desire to secure by United States Letters Patent is:

1. A pressure regulator comprising a body provided with inlet and outlet openings and an intermediate valve seat defining a valve aperture, a flexible diaphragm within said body, a valve having a stem adapted to extend freely through said aperture for attachment to said diaphragm on one side of said aperture and having on the other side of said aperture a face carrying portion too large to pass through said aperture, said portion being disposed within the regulator so as to be non-accessible from the exterior of said body when said valve is operatively mounted in said body, fastening means on said valve stem for securing said stem to said diaphragm, said fastening means having a movable part manipulatable only from the side of said diaphragm remote from said valve seat, and non-removable means wholly within said body adapted to hold said valve against undesired movement when said moveable part is manipulated, said holding means being so constructed and arranged as to be inoperable with respect to said valve during normal functioning of said regulator.

2. The pressure regulator defined in claim 1, wherein said valve face carrying portion of the valve is of irregular shape and said holding means comprises a rigid internal body portion adapted to interfit with said irregular valve face carrying portion to hold the valve against rotation during assembly.

3. The pressure regulator defined in claim 1, wherein said fastening means comprises a radial flange on said stem and said valve seat comprises an apertured member removably secured within said body to permit assembly of said valve, said aperture in said member being sufficiently large to pass said flange during assembly.

4. The pressure regulator defined in claim 1, including means within said body between said diaphragm and said valve seat providing a rest for supporting and centering said diaphragm during assembly of the regulator.

FRITZ NIESEMANN.